(12) United States Patent
Lippert et al.

(10) Patent No.: US 8,921,809 B2
(45) Date of Patent: Dec. 30, 2014

(54) DEVICE FOR MICROSCOPY HAVING SELECTIVE ILLUMINATION OF A PLANE

(75) Inventors: Helmut Lippert, Jena (DE); Christopher Power, Jena (DE); Christian Dietrich, Jena (DE); Benno Radt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 507 days.

(21) Appl. No.: 12/937,103

(22) PCT Filed: Apr. 4, 2009

(86) PCT No.: PCT/EP2009/002504
§ 371 (c)(1),
(2), (4) Date: Oct. 25, 2010

(87) PCT Pub. No.: WO2009/124700
PCT Pub. Date: Oct. 15, 2009

(65) Prior Publication Data
US 2011/0031414 A1    Feb. 10, 2011

(30) Foreign Application Priority Data

Apr. 11, 2008    (DE) .......................... 10 2008 018 476

(51) Int. Cl.
| | | |
|---|---|---|
| *G01J 1/58* | (2006.01) | |
| *G02B 21/00* | (2006.01) | |
| *G02B 21/16* | (2006.01) | |
| *G02B 21/06* | (2006.01) | |
| *G02B 21/10* | (2006.01) | |

(52) U.S. Cl.
CPC .............. *G02B 21/16* (2013.01); *G02B 21/002* (2013.01); *G02B 21/10* (2013.01); *G02B 21/06* (2013.01)
USPC ...................................................... 250/459.1

(58) Field of Classification Search
USPC ...................................................... 250/459.1
See application file for complete search history.

(56) References Cited

U.S. PATENT DOCUMENTS

2002/0168161 A1* 11/2002 Price et al. .................... 385/123
2004/0012775 A1*  1/2004 Kinney et al. .............. 356/237.2

(Continued)

FOREIGN PATENT DOCUMENTS

| DE | 102 57 423 | 6/2004 |
| DE | 10 2007 002 203 | 7/2008 |
| WO | WO 2004/053558 | 6/2004 |

OTHER PUBLICATIONS

K. Greger et al., "Basic building units and properties of a fluorescence single plane illumination microscopy", Review of Scientific Instruments, vol. 78, 2007.

(Continued)

*Primary Examiner* — David Porta
*Assistant Examiner* — Hugh H Maupin
(74) *Attorney, Agent, or Firm* — Frommer Lawrence & Haug LLP

(57) ABSTRACT

A microscopy device, particularly for use in an imaging fluorescence lifetime microscopy method is provided. The microscopy device comprises an illumination means for generating an illumination beam, an imaging detector for spatially resolved acquisition of an emission radiation emitted by an object to be examined, an illumination beam path between the illumination means and the object to be examined, and a detection beam path between the object to be examined and the detector. The illumination beam path comprises illumination optics which are designed to generate a light sheet of illumination radiation extending transverse to the axis of the illumination beam path, wherein the axis of the detection beam path is oriented substantially perpendicular to a section plane of the light sheet and of the object to be examined. The illumination means comprise a pulsed laser.

16 Claims, 5 Drawing Sheets

(56) References Cited

U.S. PATENT DOCUMENTS

| | | | | |
|---|---|---|---|---|
| 2004/0218262 | A1* | 11/2004 | Chuang et al. | 359/366 |
| 2006/0103378 | A1* | 5/2006 | Pakdaman et al. | 324/228 |
| 2007/0109633 | A1* | 5/2007 | Stelzer | 359/385 |
| 2009/0097512 | A1* | 4/2009 | Clowes et al. | 372/21 |
| 2012/0041315 | A1* | 2/2012 | Mycek et al. | 600/476 |

OTHER PUBLICATIONS

Czasch et al., "Position- and time-sensitive single photon detector with delay-line readout", Nuclear Instruments & Methods in Physics Research, Section—A:Accelerators, Spectrometers, Detectors and Associated Equipment, Bd. 580, Nr. 2, Sep. 14, 2007, XP022243056.

Michalet X et al., "A space- and time-resolved single photon counting detector for fluorescence microscopy and spectroscopy", Proceedings of the SPIE—The International Society for Optical Engineering, Feb. 9, 2006, XP002534382.

Christoph J. Engelbrecht et al., Resolution enhancement in a light-sheet-based microscope (SPIM), Optics Letters, May 15, 2006, vol. 31, No. 10.

Jan Huisken et al., "Optical Sectioning Deep Inside Live Embryos by Selective Plane Illumination Microscopy", Science, Aug. 13, 2004, vol. 305, pp. 1007-1009.

Notification of Transmittal of Translation of International Preliminary Report on Patentability dated Dec. 2, 2010; The International Bureau of WIPO, Switerzland.

Notification of Transmittal of Translation of International Preliminary Report on Patentability dated Nov. 18, 2010; The International Bureau of WIPO, Switerzland.

* cited by examiner

DEVICE FOR MICROSCOPY HAVING SELECTIVE ILLUMINATION OF A PLANE

The present application claims priority from PCT Patent Application No. PCT/EP2009/002504 filed on Apr. 4, 2009, which claims priority from German Patent Application No. DE 10 2008 018 476.4 filed on Apr. 11, 2008, the disclosure of which is incorporated herein by reference in its entirety.

BACKGROUND OF THE INVENTION

1. Field of the Invention

The present invention is directed to a microscopy device, in particular a microscopy device for the imaging acquisition of fluorescent light.

2. Description of Related Art

It is known in the field of microscopy to use fluorescent light when generating two-dimensional or three-dimensional images of an object to be examined, e.g., a biological sample. In so doing, the fluorescence intensity in particular can be detected. Further, it is possible to use the individual fluorescence lifetimes of fluorophores to generate contrasts. This latter procedure is known as FLIM (Fluorescence Lifetime Imaging Microscopy). The fluorescence lifetime of a fluorophore that can be deliberately introduced in an object to be examined or is a natural component of the object to be examined is largely dependent on the molecular environment of the fluorophore and, therefore, can be used to show the environmental parameters of a fluorophore within the framework of an imaging method. These environmental parameters can include, for example, the fluorophore concentration, pH, temperature, or viscosity. Further, the detection of fluorescent light can be used in analyzing energy transfer processes, e.g., by means of a FRET (Fluorescent Resonance Energy Transfer) mechanism so that it is possible, for example, to obtain information concerning the bonding or convolution characteristics of proteins.

Basically, there are two different known methods for imaging fluorescence lifetime microscopy. A first type of method works in the frequency domain. In this case, an excitation light source which is time-modulated at a frequency in the kilohertz range to the gigahertz range is used. The fluorescent light emitted by the object to be examined in response to the excitation light is acquired in a phase-sensitive manner so that, e.g., a mean fluorescence lifetime can be derived from the phase shift of the acquired fluorescent light. A second type of method works in the time domain. In this case, a pulsed laser with a pulse duration in the femtosecond range to the picosecond range is used to generate the excitation light, and the fluorescence decay curve is acquired at every image point. A time-correlated photon counting can be used in this case, for example.

Microscopy devices suitable for imaging fluorescence lifetime microscopy methods working in the frequency domain are known for raster scanning microscopy methods, i.e., having a single-channel detector, and for widefield microscopy methods, i.e., in conjunction with cameras. However, the problem with raster scanning methods generally is that they are relatively time-consuming with typical image recording times in the range of seconds. Widefield methods typically employ time window-controlled image intensifiers, known as gated image intensifiers, in which a multichannel plate (MCP) whose voltage can be modulated is arranged in front of a CCD (Charge Coupled Device) camera. In this way, time resolutions in the range of 100 ps can be achieved, which is sufficient for many applications. Typically, at least three image recordings are required to determine the phase shift. In multiexponential decay processes, the quantity of required image recordings increases further. This results in problems with respect to the time expended on measurements. Further, problems can arise with respect to possible bleaching processes in the fluorophores. Another problem occurring in the known methods working in the frequency domain is the impossibility of an efficient discrimination of the excitation light or autofluorescence light of the object to be examined with respect to the fluorescence radiation of interest. Signal components of excitation light or autofluorescence light in the detected emission radiation typically lead to a falsification of the determined mean fluorescence lifetime and should therefore be avoided as far as possible.

Microscopy devices for imaging fluorescence lifetime microscopy methods working in the time domain are based, for example, on the combination of confocal or multiphoton laser scanning microscopes and single photon counting and, in this case, can also afford the possibility of generating optical sections. In so doing, the arrival time of individual fluorescence photons relative to a pulse of the excitation light are measured by fast TDC (Time-to-Digital Converter) electronics. Light sources with pulse durations in the femtosecond range to the picosecond range are used for this purpose. The achievable time resolutions are in the range of a few picoseconds. Further, there are known microscopy devices for imaging fluorescence lifetime microscopy methods working in the time domain which use widefield detection and offer the possibility of generating optical sections. A microscopy device of this kind is described, for example, in "High speed optically sectioned fluorescence lifetime imaging permits study of life cell signaling events", D. M. Grant et al., Optics Express, Vol. 15, No. 24, 15656 (2007). The objects to be examined are excited focally and afocally in this case, although only the focal excitation is actually used, so that there is a problem with excessive bleaching of fluorophores.

Further, the use of SPIM (Selective Plane Illumination Microscopy) is known in connection with fluorescence microscopy methods. This technique is described, for example, in "Optical Sectioning Deep Inside Live Embryos by Selective Plane Illumination Microscopy", H. K. Stelzer et al., Science 305, 1007 (2004), in "Resolution enhancement in a light-sheet-based microscope (SPIM)", H. K. Stelzer, et al., Optics Letters, Vol. 31, No. 10, 1477 (2006), and in DE 102 57 423 A1, and WO 2004/0530558 A1

Similar to confocal laser scanning microscopy, SPIM allows the three-dimensional recording of objects in the form of optical sections, but in the framework of a widefield technique. In contrast to fluorescence microscopy using incident light or transmitted light, the fluorophores in the object to be examined are excited by laser light in the form of a light sheet in this case. The use of SPIM in imaging fluorescence lifetime measurements is described in "4D Fluorescence Lifetime Imaging Using Selective Plane Illumination Microscopy", K. Greger et al., Abstract Book, Focus on Microscopy (Jena, 2005), page 225. A CW (Continuous Wave) laser in the form of an Ar-Ion laser whose output radiation is modulated by a downstream acousto-optical modulator is used in this case.

SUMMARY OF THE INVENTION

It is the object of the present invention to provide an improved microscopy device for imaging examinations of biological or non-biological objects to be examined, particularly on the basis of fluorescent light, in which optical sections can be generated through the use of SPIM with short image recording times and reduced stressing of the samples.

According to the invention, this object is met by a microscopy device according to claim 1. The dependent patent claims define preferred and advantageous embodiment forms of the invention.

The microscopy device according to the invention comprises illumination means for generating an illumination beam, an imaging detector for spatially resolved acquisition of an emission radiation emitted by an object to be examined, an illumination beam path between the illumination means and the object to be examined, and a detection beam path between the object to be examined and the detector. The illumination beam path comprises illumination optics which are designed to generate a light sheet of illumination radiation extending transverse to the axis of the illumination beam path, wherein the axis of the detection beam path is oriented at an angle diverging from 0°, particularly substantially perpendicular to a section plane of the light sheet and of the object to be examined. Accordingly, the construction of the microscopy device substantially corresponds to the SPIM technique and accordingly makes it possible to record optical sections of the object to be examined at high speed and with low bleaching of the sample. The illumination beam path and the detection beam path are completely separated from one another.

According to the invention, the illumination means comprise a pulsed laser. In this way, the illumination radiation can be provided over a large bandwidth of wavelengths, and a high efficiency of the excitation, e.g., of fluorescence in the object to be examined, is made possible by the illumination radiation. In this connection, it is particularly advantageous when a bandwidth of at least 200 nm can be covered by the illumination beam. The pulse duration provided by the pulsed laser is preferably less than 1 ns, particularly less than 100 ps. In particular, a laser generating light pulses with a length of 10 to 40 ps at a repetition rate in a range from 20 to 50 MHz over a wavelength range of 400 nm to 750 nm can be used. It is also possible to use a laser with pulse lengths in the femtosecond range.

According to an embodiment form, the detector is designed for time-resolved acquisition of photons of the emission radiation. In particular, the spatially resolved detector can be designed as a time window-based image intensifier (i.e., a time gated image intensifier, as it is called) or as a time-resolved single photon counter. Suitable spatially resolved and temporally resolved single photon counters are described in "A space- and time-resolved single-photon counting detector for fluorescence microscopy and spectroscopy", X. Michalet et al., Proc. of SPIE, Vol. 6092, 60920M (2006) and in "Position- and time-sensitive single photon detector with delay-line readout", A. Czasch et al., Nuclear Instruments and Methods in Physics Research A 580 (2007), 1066-1070.

Through the use of these time-resolved detectors, the microscopy device can be used for imaging fluorescence lifetime microscopy methods particularly in the time domain. For example, the detector can deliver a fluorescence decay curve as the result of the measurement for each image point. Further, the time resolution makes it possible to discriminate between different signal components of the emission radiation emitted by the object to be examined, particularly between autofluorescence radiation of materials naturally contained in the object to be examined and fluorescence radiation of fluorescent dyes deliberately introduced into the object to be examined, as well as between fluorescence radiation and reflected or scattered illumination radiation. The different signal components distinguished in this way can be used for suppressing certain signal components, e.g., autofluorescence, or for parallel imaging evaluation of different signal components. In both case, an extremely efficient image recording and evaluation is ensured.

To provide the spatial resolution, the detector typically has a plurality of detector elements which can be arranged in the form of a regular grid or a matrix or in the form of a substantially linear arrangement to realize a linear array detector. Each of the detector elements is designed to emit a time signal depending on an acquisition time of at least one photon relative to a pulse of the illumination beam and/or to control the acquisition of photons depending on a time signal generated relative to the pulse of the illumination beam. Accordingly, in either case, time information is available about the time signal which substantially corresponds to the time difference between a pulse of the illumination beam and the time of the acquisition of a photon of the emission radiation. Therefore, by acquiring a plurality of photons, the decay curve of the fluorescence radiation of a fluorophore in the object to be examined can be acquired, for example.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
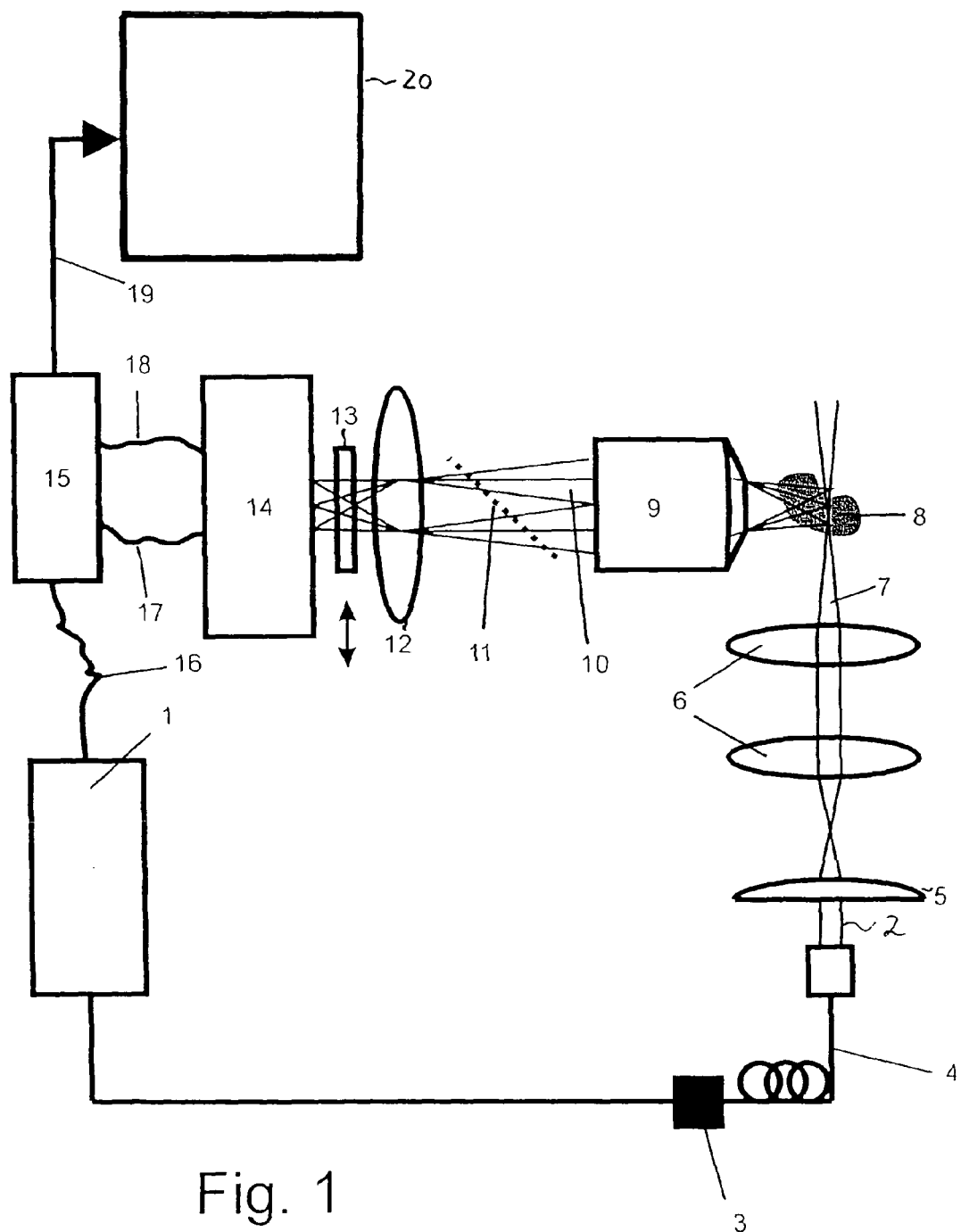
FIG. 1 shows a schematic diagram of a microscopy device according to an embodiment example of the invention.

FIG. 1 is a schematic diagram showing a microscopy device according to an embodiment example of the invention. The microscopy device is designed for use in imaging fluorescence lifetime microscopy methods in the time domain in which the generation of optical sections by the SPIM technique is provided.

The microscopy device comprises illumination means having a broadband laser 1, an adjustable acousto-optical filter 3 for external wavelength selection, and a broadband light conducting fiber 4. For example, the laser 1 can generate pulses of the illumination radiation with a length of 20 ps in a wavelength range from 450 nm to 700 nm. The repetition rate of the pulses is, for example, 40 MHz. The output radiation of the laser 1 can be a white light continuum from which the wavelengths used in the illumination beam are filtered out externally, e.g., through the adjustable acousto-optical filter 3, or the laser 1 itself can comprise suitable means for wavelength selection, e.g., an internal adjustable acousto-optical filter or a frequency conversion unit. The laser 1 can be a fiber-based supercontinuum laser. In the event that the laser 1 itself contains means for wavelength selection, the adjustable acousto-optical filter 3 can possibly be omitted. A suitable laser is commercially available, for example, from the firm Fianium Ltd.

The microscopy device further comprises an illumination beam path 2 in which the illumination beam generated by the laser 1 is coupled in via the optical fiber 4. Cylindrical optics 5 and imaging optics 6 which shape the illumination beam into a light sheet 7 are arranged in the illumination beam path 2. The light sheet 7 is directed to an object to be examined 8 and pierces it in a focus plane of the illumination beam path 2. In particular, the object to be examined can be a biological sample which is, for example, embedded in a transparent gel.

The microscopy device further comprises a detection beam path 10 in which a detection objective 9 is arranged, radiation emitted by the object to be examined 8 being received via this detection objective 9. The axis of the detection beam path 10 is substantially perpendicular to the axis of the illumination beam path 2 and particularly substantially perpendicular to the section plane of the light sheet 7 with the object to be examined 8. The object to be examined 8 is consequently illuminated only in one plane. The detection objective 9 serves for focusing in a focus plane of the detection beam path 10. The illumination beam path 2 and the detection beam path are completely separated from one another and meet only in the respective focus plane. Arrangements with an angle between the detection beam path and illumination beam path of between 0° and 90° are also conceivable. It is crucial that the illumination beam path 2 and the detection beam path are not oriented in parallel.

The microscopy device further comprises a device (not shown) for positioning the object to be examined 8 relative to the light sheet 7 so that different optical sections of the object to be examined 8 which can serve as a foundation for three-dimensional image data sets can be received by means of a relative movement of the object to be examined 8 along the axis of the detection beam path 10 and/or relative to the illumination beam path 2. The relative movement can also be a rotation of the object to be examined 8.

Further, the detection beam path 10 comprises a tube lens 12 by which the emitted radiation acquired by the detection objective 9 is supplied to a detector 14. Further, a color splitter 11 which makes it possible, for example, to link incident fluorescence excitation units, e.g., a confocal laser scanning microscope or an epifluorescence microscope, can be provided in the detection beam path 10. Further, an emission filter 13 which blocks illumination radiation that is reflected or scattered by the object to be examined 8 in the detection beam path 10 can be provided in the detection beam path 10. However, the emission filter 13 is not required for all operating modes of the microscopy device and is therefore preferably removable. In some operating modes, it may even be desirable for the detector 14 to acquire reflected or scattered illumination radiation.

In the microscopy device, all of the excitation lines available in the bandwidth of the illumination beam provided by the laser 1 can be used for fluorescence excitation or for another kind of illumination of the object to be examined 8. In this way, it is possible in particular to cover, and even excite in an optimized manner, the entire bandwidth of fluorescent dyes, for example, when selecting the wavelength of the absorption maximum of a fluorescent dye for the excitation. Further, it is possible to excite the object to be examined 8 with a broad spectral band of the illumination radiation, for example, to make a higher output available for the excitation. It is also possible to use structured spectral bands of the illumination radiation for excitation. The latter can be advantageous in some fluorescent dyes, for example, when specific bleaching channels should be suppressed.

The microscopy device further comprises the detector 14 and evaluating and controlling electronics 15. In connection with the evaluating and controlling electronics 15, the detector 14 is capable of spatially and temporally resolving the impingement of photons of the radiation emitted by the object to be examined 8. In particular, the detector 14 can comprise a time window-based image intensifier such as is commercially available, e.g., from the firm Kentech Ltd. The evaluating and controlling electronics 15 are connected to the detector 14 by signal lines 17 and 18. Further, the evaluating and controlling electronics 15 are connected to the laser 1 by a signal line 16. The laser 1 conveys a trigger signal to the evaluating and controlling electronics 15 via the signal line 16. The trigger signal comprises trigger pulses which are substantially simultaneous with the generated pulses of the illumination radiation or have a known time offset with respect to them. Based on this trigger signal, the evaluating and controlling electronics 15 generate time window control signals which are conveyed to the detector 14 via signal line 17. The detector 14 in turn conveys information about the detection of a photon and information about the location where this photon was detected via signal line 18.

Alternatively, the detector 14 can also comprise a spatially and temporally resolved single photon counter such as that described, for example, in "A space- and time-resolved single-photon counting detector for fluorescence microscopy and spectroscopy", X. Michalet et al., Proc. of SPIE, Vol. 6092, 609220M (2006) or in "Position- and time-sensitive single photon detector with delay-line readout", A. Czasch et al., Nuclear Instruments and Methods in Physics Research A 580 (2007), 1066-1070. Accordingly, the detector comprises, for example, a multialkali photocathode, an MCP (Micro-Channel Plate) stack, and a crossed delay line anode. Photons encountering the cathode are amplified in their effect by the MCP stack and generate a signal pulse on the anode, and information about the point of impact of the photons can be derived from the time of flight of the signal pulse to the detection electronics. Instead of the delay line anode, a segmented anode can also be used. In this case, the signal line 17 serves substantially to initialize the detector 14. The following information is preferably conveyed via signal line 18: the arrival time of a photon of the emitted radiation relative to the initialization signal, a delayed signal for a first spatial direction, e.g., an x-position, and a delayed signal for a second spatial direction, e.g., a y-position. The location and time of the acquisition of the photon can be determined from these three pieces of information. Since essentially a photon counting method is used in the detector 14, the detector 14 preferably also comprises a discriminator for suppressing electronic noise components. In this way, readout noise can be prevented.

Through the use of a spatially resolved and temporally resolved single photon counter of this kind, there is no restriction on time windows in the acquisition of photons. This can prevent the loss of photons of the emitted radiation impinging on the detector 14 outside the fixed time window. By using spatially resolved and temporally resolved single photon counters as detectors, spatial resolutions of at least 150×150 image points, e.g., 1000×1000 image points, and time resolutions of about 100 ps can be achieved.

Further, the microscopy device comprises an analyzing computer 20 which is connected to the evaluating and controlling electronics 15 by a signal line 19. Measurements determined by the evaluating and controlling electronics 15 are supplied to the analyzing computer 20 via signal line 19. By means of the analyzing computer 20, for example, fluorescence decay time curves can be displayed visually and stored, or two-dimensional or three-dimensional image data acquired by the microscopy device can be displayed, stored and further processed. It goes without saying that the evaluating and controlling electronics 15 and the analyzing computer 20 can be implemented in an individual microprocessor-based system which can also serve at the same time for controlling the essential functions of the microscopy device, e.g., by means of a graphical user interface.

Figure 2:
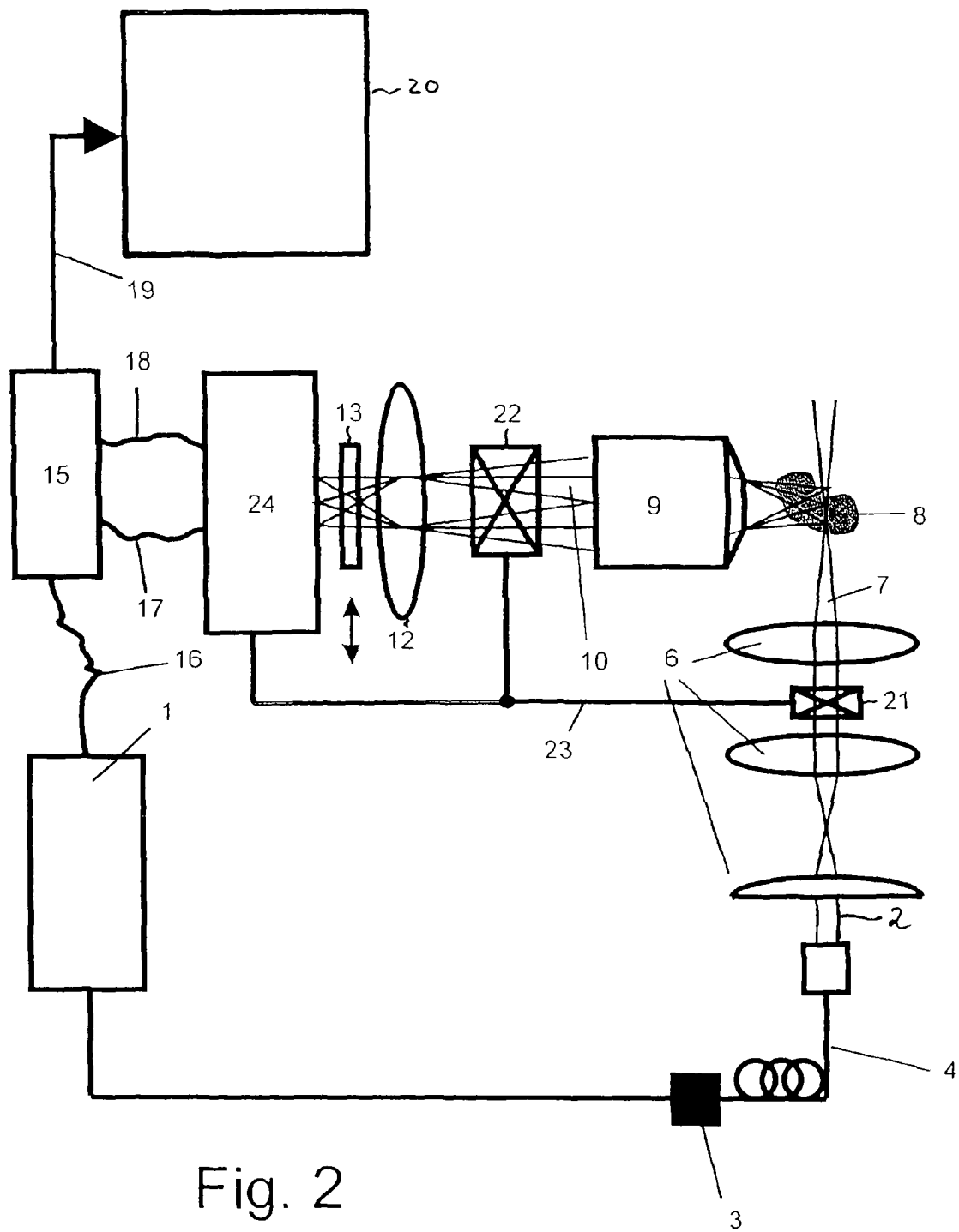
FIG. 2 shows a schematic diagram of a microscopy device according to another embodiment example of the invention.

FIG. 2 shows a microscopy device according to another embodiment example of the invention. The microscopy device of FIG. 2 substantially corresponds to that shown in FIG. 1, and similar components have been designated by the same reference numbers. These components will not be described here. Instead, reference is had to the corresponding remarks in connection with FIG. 1. Only the essential differences between the microscopy device of FIG. 2 and that of FIG. 1 should be described in the following.

While the light sheet 7 is shaped by cylindrical optics in the microscopy device of FIG. 1, it is defined in the microscopy device in FIG. 2 by an approximately linear light beam scanning the focus plane. For this purpose, the microscopy device comprises a first raster scanning unit 21 which carries out a corresponding deflection of the light beam which is coupled into the illumination beam path 2 by the laser 1 via the optical fiber 4. Further, the cylindrical optics 5 shown in FIG. 1 are replaced by another element of the imaging optics 6.

Further, a second raster scanning unit 22 is introduced into the detection beam path 10. This second raster scanning unit 22 is synchronized with the first raster scanning unit 21 in such a way that the line illuminated in the focus plane at the respective recording time is imaged on a linear arrangement of detector elements of a detector 24. The synchronization is carried out by means of a synchronization signal which is conveyed between the raster scanning units 21, 22, or to the raster scanning units 21, 22, by a signal line 23. Consequently, the detector 24 is not constructed as a matrix array detector but as a linear array detector. The detector 24 accordingly delivers only a one-dimensional position signal. A further position signal is available by controlling the first and second raster scanning units 21, 22. In other respects, the characteristics of the detector 24 correspond to those of the detector 14 in FIG. 1. Consequently, on the whole, the same spatial and temporal information is available for an evaluation in the evaluating and controlling electronics 15. Owing to a technically simplified construction of a linear array detector compared to a matrix array detector, however, higher spatial and temporal resolutions can be achieved. Further, saturation effects and so-called pile-up effects can be reduced.

Figure 3:
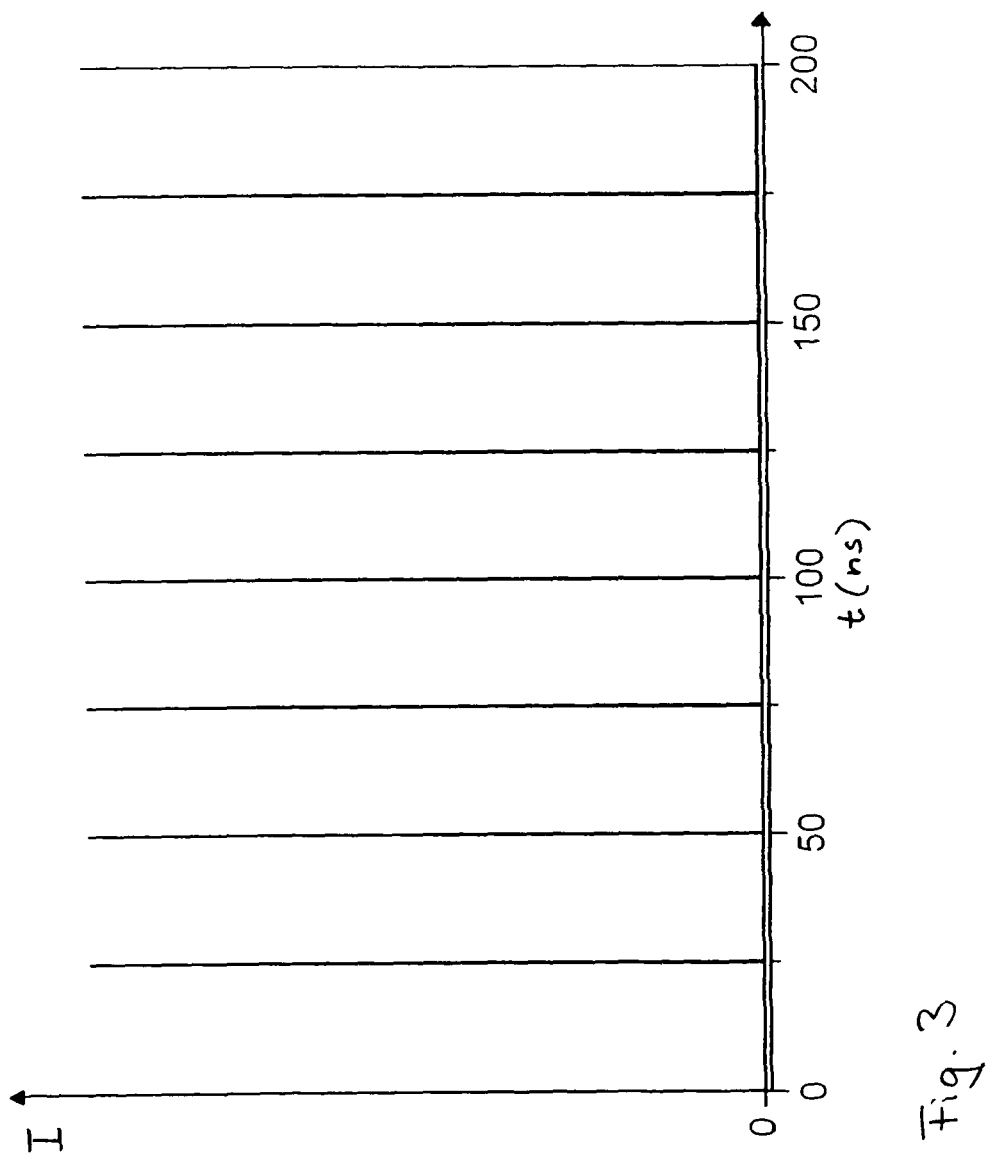
FIG. 3 shows a sequence of pulses of the illumination beam in a microscopy device according to an embodiment example of the invention.

By way of example, FIG. 3 shows a sequence a pulses of the illumination beam. In FIG. 3, the intensity of the illumination beam is designated by I. The time axis is designated by t. It will be noted that the illumination radiation has sharply defined pulses. The pulse length is about 20 ps in the example. The distance between two pulses is around 25 ns, which corresponds to a repetition rate of 40 MHz. As was already mentioned, the illumination means for generating the pulsed illumination radiation comprise a suitably designed laser. In particular, the laser can be a supercontinuum laser which covers a wavelength range of at least 450 to 700 nm.

Figure 4:
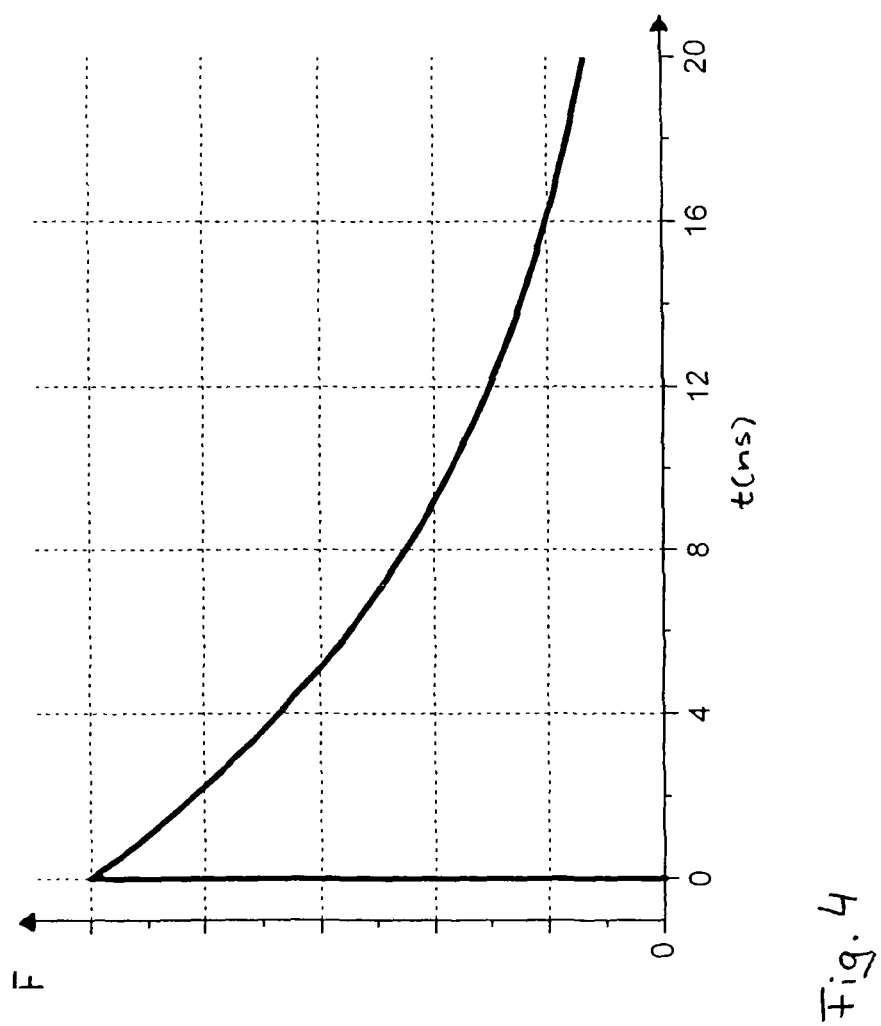
FIG. 4 shows a fluorescence decay curve, by way of example, which can be detected by a microscopy device according to an embodiment example of the invention.

By way of example, FIG. 4 shows the pathway of a fluorescence decay curve such as can be obtained as a result of the time-resolved evaluation of the emitted radiation by means of the detector 14, 24 and the evaluating and controlling electronics 15 of the microscopy devices of FIGS. 1 and 2. The signal strength of the fluorescence radiation is designated by F in FIG. 4. The time axis is designated by t. The detectors 14, 24 present a decay curve of the type shown in FIG. 4 for each of its detector elements, i.e., for every image point. The fluorescence decay curve can be detected substantially over the entire time period between two successive pulses of the illumination beam.

When a time window-based image intensifier is used in the detector 14, 24, the fluorescence decay curve is acquired in that a plurality of measurements are carried out with differently set time windows. The position of the time window then yields the position of a point on the decay curve along the time axis. When a spatially resolved and temporally resolved single photon counter is used in the detector 14, 24, the time information can be obtained directly from the output of the detector 14, 24. The value F for a determined point on the time axis is given by the quantity of photons counted for the range of this time point, i.e., by a histogram evaluation of the detected photons.

A fluorescence decay curve of the type shown in FIG. 4 can be used in imaging examinations for contrasting according to a fluorescence lifetime microscopy method. For example, two different fluorescing dyes can be distinguished from one another, which can be converted into contrast information. The fluorescence lifetime can also be determined computationally in a detailed detection of the fluorescence decay curve.

In case it is only necessary to distinguish between two different fluorescent dyes, substantially the entire fluorescence decay curve need not be recorded when using a time window-based image intensifier. Rather, it can be sufficient to use only two suitably set time windows. In general, it is possible to distinguish one signal component of the emitted radiation from another based on a decay curve of the type shown in FIG. 4 and to discriminate between them when they have different decay behaviors. On the one hand, this can be used in the microscopy devices of FIG. 1 and FIG. 2 to suppress unwanted signal components, e.g., autofluorescence radiation or reflected or scattered illumination radiation. However, it is also possible to evaluate these different signal components separately and convert them into contrast information for the imaging process.

Figure 5:
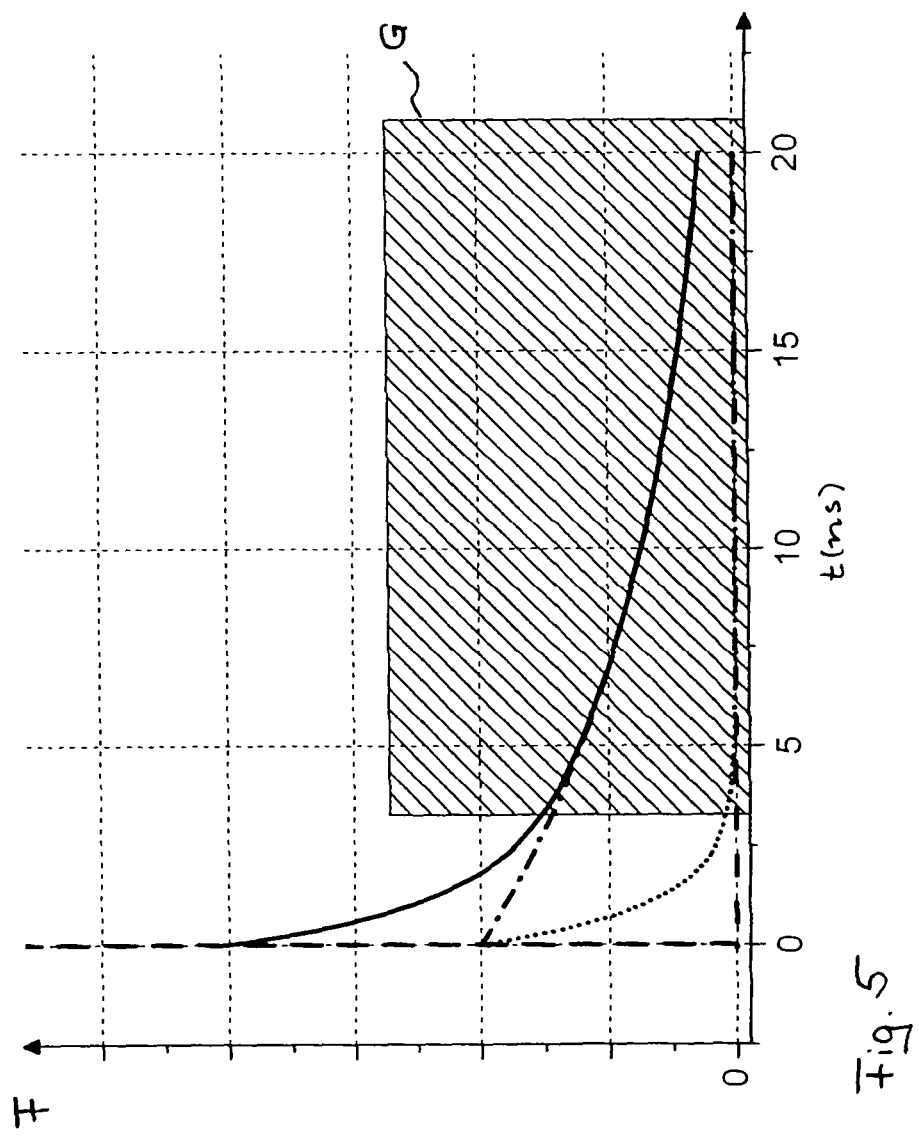
FIG. 5 shows the use of a time window for discriminating signal components of an emitted radiation in the microscopy device according to an embodiment example of the invention.

By way of example, FIG. 5 shows a situation in which the detected fluorescence decay curve is composed of a plurality of signal components. The signal strength of the fluorescence radiation is designated by F. The time axis is designated by t. In FIG. 5, the laser pulse is shown by a dashed line. A first signal component of the detected decay curve is shown by a dash-dot line. A lifetime of $\tau=10$ ns characterizing the decay behavior is assigned to this signal component. A second signal component of the detected decay curve is shown by a dotted line. A lifetime of $\tau=1$ ns characterizing the decay behavior is assigned to this signal component. A solid line shows the total signal which is composed of the first signal component and the second signal component. A time window used for detection is shown in FIG. 5 by the shaded area G. For example, the first signal component can correspond to the fluorescence of a fluorescent dye deliberately introduced into the object to be examined, while the second signal component corresponds to an autofluorescence of material which is naturally contained in the object to be examined. In many applications, a signal component of this kind which is based on autofluorescence leads to a sharp reduction in contrast.

As can be seen from FIG. 5, the time window G is set in such a way that the pathway of the total decay curve substantially corresponds to that of the first signal component within time window G because the decay process of the first signal component is already substantially terminated at the start of the time window. This is achieved in that the start time of the time window G relative to the pulse of the illumination radiation is set in such a way that it is substantially greater than the lifetime T of the signal component to be suppressed. A second time window which covers the time period before the start of the time window G could be set in order to be able to evaluate the two signal components separately.

The suppression of autofluorescence radiation is particularly advantageous in connection with resolution-enhancing methods such as those presented, e.g., in "Imaging Intracellular Fluorescent Proteins at Nanometer Resolution", E. Betzig et al., Science 313, 1542 (2006). In this case, the centroid of the intensity distribution on a spatially resolved detector is determined for an individual molecule from a plurality of individual molecule excitations so that resolutions of up to 20 nm can be achieved. Since autofluorescence radiation can be effectively suppressed as was shown above in the microscopy devices of FIG. 1 and FIG. 2, they make it possible to use a resolution-enhancing method of this kind also in imaging examination of optical sections with SPIM. In particular, methods which limit the excitation volume, e.g., fluorescence microscopy with total internal reflection or TIRF (Total Internal Reflection Fluorescence) microscopy, can be dispensed with.

Further, it can also be seen from FIG. 5 that the time-resolved detection of the emitted radiation is suitable for separating signal components of the illumination radiation, particularly reflected illumination radiation, from the other signal components.

This can be used in turn to suppress the signal component of reflected illumination radiation in the detected emitted radiation without requiring the emission filter 13 for this purpose or to carry out a separate imaging evaluation in parallel based on the reflected illumination radiation. In the latter case, the emission filter 13 is preferably removed from the detection beam path. In so doing, a special advantage results in that there is no limitation with respect to possible excitation wave regions or excitation wave combinations in generating the illumination radiation. For example, excitation wave regions or excitation wave combinations of this kind for which there are no available optical filters that are suitable as emission filters or for which such filters can be produced only at a high financial and technological cost can be used.

Of course, the preceding description covers only some embodiment examples of the present invention and various modifications can be carried out in these embodiment examples without deviating from the essential concepts of the invention. For example, the illumination means can also comprise a plurality of lasers whose combined output radiation is coupled into the illumination radiation. Further, it is also possible to generate the light sheet through linear raster scanning in the focus plane of the illumination beam path as was described in connection with FIG. 2, but to use a matrix array detector for detecting the emitted radiation as was described in connection with FIG. 1. In this case, the second raster scanning unit in the detection beam path can be omitted. Further, it is also possible to operate a spatially and temporally resolved single photon counter with detection time windows as was described in connection with FIG. 5. Accordingly, the preferred embodiments of the invention as set forth above are intended to be illustrative, not limiting. Various changes may be made without departing from the spirit and scope of the inventions as defined in the following claims.

The invention claimed is:

1. A microscopy device comprising:
   illumination means for generating an illumination beam;
   an imaging detector comprising a plurality of detector elements for spatially resolved acquisition of an fluorescence emission radiation emitted by an object to be examined and time-resolved acquisition of photons of the fluorescence emission radiation;
   an illumination beam path between the illumination means and the object to be examined; and
   a detection beam path between the object to be examined and the detector;
   wherein the illumination beam path comprises illumination optics which are designed to generate a light sheet of illumination radiation extending transverse to the axis of the illumination beam path;
   wherein the axis of the detection beam path is oriented substantially perpendicular to a section plane of the light sheet and of the object to be examined;
   wherein the microscopy device comprises evaluating and controlling means which are designed to discriminate between different signal components of the fluorescence emission radiation depending on an acquisition time of photons of the emission radiation;
   wherein the controlling and evaluating means are designed to carry out an imaging evaluation in parallel for at least two of the signal components; and
   wherein the illumination means comprise a pulsed laser.

2. The microscopy device according to claim 1;
   wherein the detector is designed as a time window-based image intensifier.

3. The microscopy device according to claim 1;
   wherein the detector is designed as a single photon counter.

4. The microscopy device according to claim 1;
   wherein the detector comprises a plurality of detector elements, each of which is designed to emit a time signal depending on an acquisition time of at least one photon relative to a pulse of the illumination beam or to control the acquisition of photons depending on a time signal generated relative to the pulse of the illumination beam.

5. The microscopy device according to claim 4;
   wherein the microscopy device comprises evaluating and controlling means which are designed to evaluate he time signals with respect to at least one fluorescence lifetime.

6. The microscopy device according to claim 1;
   wherein the different signal components include auto fluorescence radiation of the object to be examined, fluorescence radiation of fluorescent dyes introduced into the object to be examined, or reflected illumination radiation.

7. The microscopy device according to claim 1, further comprising:
   a first raster scanning unit for substantially linear raster scanning of the focus plane in the illumination beam path.

8. The microscopy device according to claim 7, further comprising:
   a second raster scanning unit for substantially linear raster scanning of the focus plane in the detection beam path, wherein the detector is constructed as a linear array detector.

9. The microscopy device according to claim 1;
   wherein the illumination optics comprise cylindrical optics for forming a light sheet.

10. The microscopy device according to claim 1; wherein the pulsed laser has a pulse duration of less than 1 ns.

11. The microscopy device according to claim 1; wherein the illumination means are constructed in such a way that a bandwidth of at least 200 nm can be covered with the illumination radiation.

12. The microscopy device according to claim 1; wherein the laser is constructed as a supercontinuum laser.

13. The microscopy device according to claim 1, further comprising:
an adjustable filter for spectrally structured filtering of the illumination radiation.

14. The microscopy device according to claim 1, further comprising:
means for positioning the object to be examined relative to the illumination beam path or detection beam path.

15. A method comprising:
utilizing a microscopy device according to claim 1 in an imaging fluorescence lifetime microscopy method.

16. The microscopy device according to claim 1; wherein the pulsed laser of the illumination means has a pulse in the femtosecond range.

* * * * *